ADDER CIRCUIT

Filed Feb. 10, 1958

INVENTOR.
Richard K. Richards
BY
Norman C. Fulmer
Att'y.

June 13, 1961 R. K. RICHARDS 2,988,278

ADDER CIRCUIT

Filed Feb. 10, 1958 3 Sheets-Sheet 2

INVENTOR.

Richard K. Richards

BY Norman C. Fulmer

Att'y.

June 13, 1961 R. K. RICHARDS 2,988,278

ADDER CIRCUIT

Filed Feb. 10, 1958 3 Sheets-Sheet 3

INVENTOR.
Richard K. Richards
BY
Norman C. Fulmer
Att'y.

United States Patent Office 2,988,278

Patented June 13, 1961

2,988,278

ADDER CIRCUIT

Richard K. Richards, Old Troy Road, Wappingers Falls, N.Y.

Filed Feb. 10, 1958, Ser. No. 714,240
23 Claims. (Cl. 235—175)

This invention relates to adder circuits as are used in digital computers and in other digital machines. More specifically, it relates to improvements in such circuits and to means for adapting the adder circuit to the operation of subtraction.

In the preferred embodiments of the invention, cryotron current-switching devices are used. A cryotron is a relatively new type of computer component and is described in some detail in a paper by D. A. Buck in the April 1956, issue of the Proceedings of the Institute of Radio Engineers on pages 482–493. Briefly, the cryotron utilizes the superconductive characteristics of certain metals, at very low temperatures, for its mechanism of functioning. One of the more important of these characteristics is the fact that the transition temperature between the superconductive and normal-resistance states is a function of the strength of the magnetic field in the region of the conducting element. Thus, at a given temperature, a magnetic field can be utilized to control the resistance of an element. Although the cryotron requires that the system be refrigerated to a very low temperature, there are many advantages in the use of cryotrons in digital computers in comparison with vacuum tubes, transistors, and other more conventional components. These potential advantages include very low power consumption, light weight, small space, low cost, and high speed.

The addition of two numbers is a basic function in digital computers. In digital computers employing cryotrons as the principal components, various circuits capable of performing addition have been devised, but these circuits have the disadvantage of requiring that an objectionably large number of cryotrons must be used, and they are therefore costly. Also, these circuits are complicated and difficult to understand, and further, they involve temporary but unwanted disturbances to the flow of current in certain electrical paths.

An object of this invention is to provide an improved cryotron adder circuit which minimizes the number of cryotrons required.

Another object is to provide an adder circuit which is simple and easy to understand.

Still another object is to provide an adder circuit which functions without unwanted disturbances to current flow in any part of the adder circuit or its associated flip-flops.

Still another object is to provide a simple circuit means for the addition of negative numbers (subtraction).

The adder circuit of this invention operates with the binary system of numbers although, as is well known, binary circuits can be adapted to decimal notation. In binary notation, all digits are either 0 or 1. The rules of addition for binary numbers can be expressed in several different ways, but basically the procedure for addition is to count the number of 1's in corresponding orders of the two numbers to be added. In each order, there are three sources of binary digits. One is the digit in the augend, the second source is the digit in the addend, and the third source is the carry digit from the next lower order. With three sources of binary digits, the sum can be either zero, one, two, or three, expressed as 00, 01, 10, or 11, respectively, in the binary system. From the binary representation of the numbers zero through three, it is apparent that the sum digit is 0 if none or two of the three binary digits in a given order are 1 and that the sum digit is 1 if one or all three digits are 1. On the other hand, the carry digit to be added to the next higher order is 0 if none or only one of the three digits being added is 1, and the carry is 1 if two or all three of the digits are 1.

To add two numbers, the numbers are placed in a storage register which comprises a set of cryotron flip-flops of a type to be described. The two registers are interconnected by the adder circuit which also interconnects the two registers with a third register which is to contain the sum. The actual addition takes place when a signal is applied at certain terminals of the adder network.

The objects of this invention are achieved by a novel and simple circuit which makes the determination of the number of binary 1's in a given order and then, in a novel fashion, sets the sum flip-flop accordingly and at the same time passes current on one of two output wires to the stage of the next higher order to serve as the carry signal for that order.

Another novel feature which is used in achieving the objects of this invention is an arrangement for entering one of the numbers into the sum flip-flops prior to the actual addition operation. Then it is necessary that the adder circuit apply signals to a given sum flip-flop only in those instances when the binary value in that flip-flop must be changed.

The various objects which have been mentioned, as well as other objects of the invention, are achieved by the preferred embodiments which are disclosed in the following description and claims and are illustrated in the drawings, which disclose by way of examples the preferred embodiments of the invention and describe the best modes which have been contemplated for carrying out these embodiments.

Figures 1, 2, 3, 4, 5:
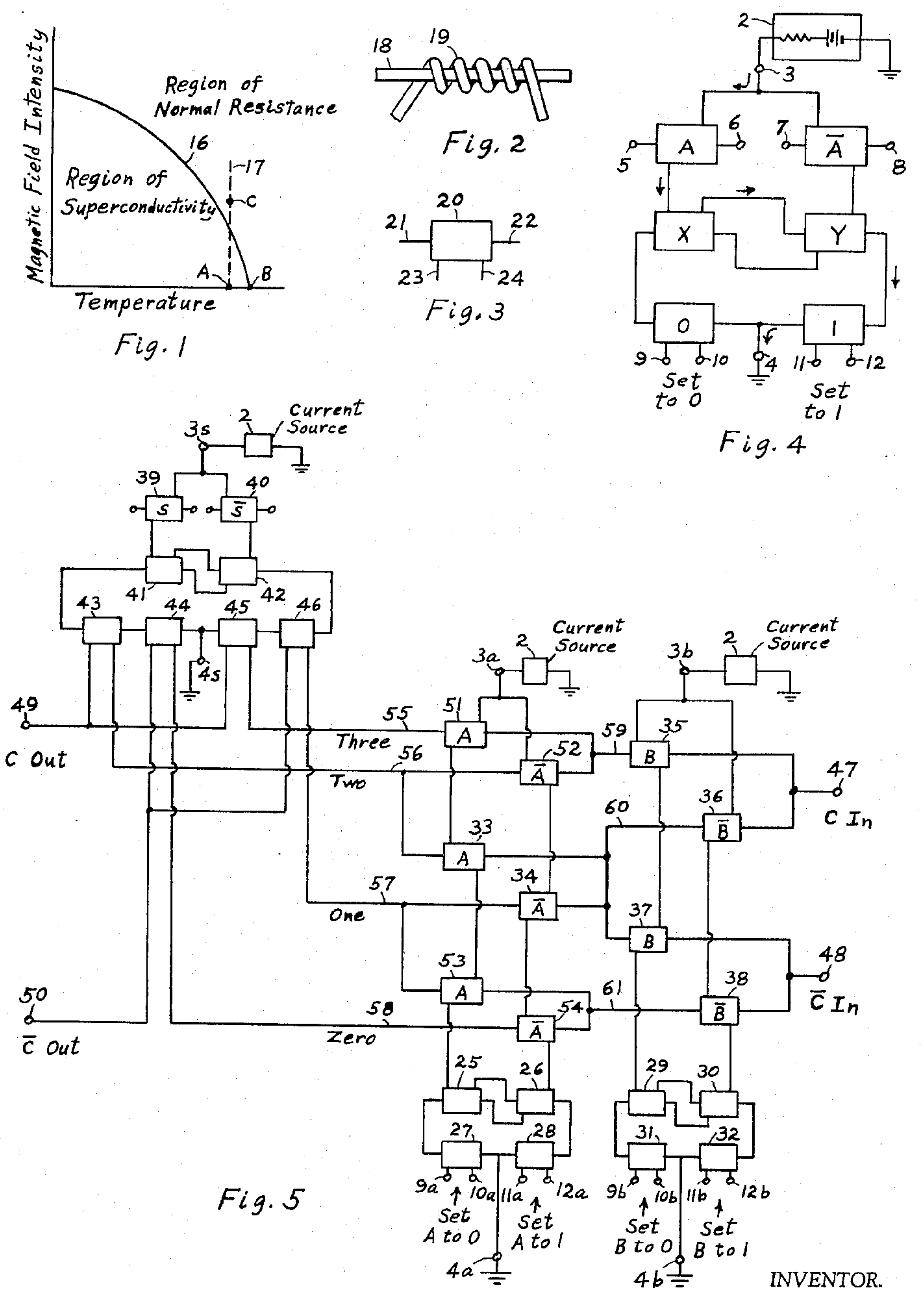
FIG. 1 is a graph of the magnetic field intensity needed to produce a transition from the superconducting condition to the normal-resistance condition, as a function of temperature, for a typical superconductive material.
FIG. 2 shows a cryotron structure.
FIG. 3 shows a symbol that will be used to represent a cryotron in all subsequent figures.
FIG. 4 is a schematic diagram of a cryotron flip-flop circuit.
FIG. 5 is a schematic diagram of a single-order adder circuit in accordance with the invention.

The cryotron, which is used in the preferred embodiments of the invention, will now be described briefly. When certain materials are cooled to a very low temperature, it is found that they exhibit very low resistance properties. Further, it is found with these materials that as the temperature is lowered, a discontinuous transition occurs at which the resistance suddenly changes from what might be called a normal-resistance value to a value which is exactly zero within the limits of presently available measuring techniques. When the resistance is exactly zero the material is said to be in the superconducting condition, and materials which exhibit this phenomenon are called superconductors. The temperature of transition between the normal-resistance state and the superconducting state is different for different superconductors, but in all instances is very low and for many of the superconductors this temperature is in the range of 2° K. to 15° K.

From the standpoint of the functioning of a cryotron, the important feature of the superconductive phenomenon is that the temperature of transition is a function of the intensity of the magnetic field in the region of the material. The temperature of transition decreases as the intensity of the magnetic field is increased. This relationship is illustrated in a qualitative manner for a typical superconductive material in FIG. 1, which shows a curve 16 of the transition magnetic field intensity (M.M.F.) as a function of temperature. This plot may be interpreted in the following manner. If the material is at a given temperature and if a magnetic field of a given intensity is maintained in the region of the material, the temperature and field can be represented by a point on the plane of the graph. If this point falls in the region inside the curve 16, the material is in the superconducting condition. If the point falls in the region outside of the curve, the material is in the normal-resistance condition. These two regions are indicated in the figure.

If the temperature of the material is maintained at the value A, which is slightly less than the transition temperature B for zero applied field, the material will be in the superconducting condition, but it can be carried out of this condition and into the normal-resistance condition, at point C for example, by the application of a relatively small magnetic field. This action is indicated by the vertical dotted line 17 in FIG. 1. When the applied field is removed, the material will return to the superconducting condition.

The superconductive phenomenon as described is the basis of the functioning of a cryotron. The function of a cryotron is to control the flow of current in one part of a circuit by means of a signal applied to another part of the circuit. This function is substantially the same as the function performed by an electromagnetic relay, a vacuum tube, or a transistor, but since these components are generally quite different from each other in their mechanism of operation, the circuits used with them are generally quite different.

An example of a cryotron, as illustrated in FIG. 2, is a straight wire 18 on which another wire 19 is wound in a helical manner. The magnetic field which is created by current in the winding 19 controls the flow of current in the straight wire 18. The temperature and material of the straight wire are chosen so that operation corresponding to the dotted line in FIG. 1 is obtained. The material of the winding 19 is chosen to be a superconductor with a transition M.M.F. that is substantially greater than the maximum M.M.F. to be encountered, so that the winding remains a superconductor at all times. When no current flows in the winding 19, the resistance of the straight wire 18 is zero, but when a current of sufficient amplitude is caused to flow in the winding 19, the straight wire 18 is caused to be in the normal-resistance condition so that the flow of current therein is impeded.

The function of the cryotron is similar to that of a normally-closed relay. In the absence of a current in the winding of the relay, the contacts are closed and thereby allow the current to flow. When a signal is applied to the winding of the relay, the contacts open and impede the flow of current. Because of the analogy to a relay, the two parts of the cryotron will be referred to as the input winding and the contact. It is to be understood, however, that the term "input winding" is used in a broad sense so as to include any sort of cryotron input arrangement.

There are many design considerations of importance in developing a practical cryotron, particularly when large current amplification factor and high speed are involved. However, these considerations are not of consequence with regard to the principles of this invention, and therefore will be omitted from the following description.

The symbol to be used for a cryotron, shown in FIG. 3, is a rectangle 20 with four lines drawn to it. The two lines 21, 22 at the ends of the rectangle represent the connections to the contact of the cryotron, and the two lines 23, 24 at the side represent the connections to the input winding. One of the connections to the input winding can be drawn at the opposite side of the rectangle without altering the meaning of the symbol and without implying any difference in the physical or electrical properties of the cryotron.

In the cryotron and in the circuits to be described, the current in either the input winding or the contact may flow in either direction. In other words, the properties of the cryotron are independent of direction of current flow. In some parts of the description, it will be stated that current flows in one direction or the other along a wire, but it should be understood that the operation described is only for the purpose of illustration, and current flow in the opposite direction will produce equally satisfactory performance.

In adapting cryotrons to digital computers it is known to the prior art that desirable circuits can be obtained if two or more parallel paths are provided for the flow of current where, under each set of operating circumstances, one and only one path offers zero resistance to the flow of current and where each other path contains at least one contact held in the normal-resistance condition to impede the flow of current. In this case, all of the current will flow in the path of zero resistance and will actuate the input windings of any cryotrons that may be connected in series with that path. The input windings are always in the superconducting condition. The novelty of this invention is in the arrangement in which the cryotrons are interconnected to provide the alternative paths, in a straightforward manner, for the functions of addition and subtraction, and in a manner by which the required number of cryotrons is held to a minimum.

The basic cryotron flip-flop circuit, which is not a part of this invention but is a preferred type of flip-flop circuit to be used in the circuit of the invention, is shown in FIG. 4. The circuit of FIG. 4 comprises a first series circuit, between terminals 3 and 4, of the winding of a cryotron A, the winding of a cryotron X, the contact of a cryotron Y, and the contact of a cryotron 1; and a second series circuit, between the terminals 3 and 4, of the winding of a cryotron $\overline{A}$, the winding of a cryotron Y, the contact of cryotron X, and the contact of a cryotron 0. A current source 2, which may comprise a resistor and a voltage source connected in series, is connected between the terminals 3 and 4. The flip-flop circuit is bistable in that it can exist in one of two stable states. The two stable states are distinguished by which of the two paths current flows through from terminal 3 to terminal 4. One possible path is indicated by the arrows in the figure. Current flows from terminal 3 through the input winding of cryotron A, through the winding of cryotron X, through the contact of cryotron Y, and then through the contact of cryotron 1 to ground. If current flows in this path, current flow in the alternate path, which includes the contact of X, is blocked because current in the first-described path causes the contact of X to be in the normal-resistance condition. Conversely, if the current had initially been flowing in the alternate path, current flow in the first-described path would be blocked because the contact of Y would be held in the normal-resistance condition. The flip-flop is said to store a binary 1 or a 0 in accordance with which path the current flows in. The convention will be adopted here that current flow in the path indicated by the arrows will correspond to the storage of a binary 0, with current flow in the opposite path corresponding to a binary 1.

In the circuit of FIG. 4, the cryotrons X and Y perform the binary storage function. Cryotrons A and $\overline{A}$ perform an output function and cryotrons 0 and 1 perform an input function. With current flow as indicated by the arrows, the flip-flop stores a 0. The flip-flop can be set to 1 by passing a current from terminal 11, through the input winding of cryotron 1, to terminal 12. This current causes the flow of current through the contact of cryotron 1 to be diminished sufficiently to allow the contact of X to become in the superconducting condition. Current then will flow in the alternate path and cause the current in the first path to be blocked. The current will continue in the alternate path even after the input current at terminals 11 and 12 is terminated. By a similar process, if the flip-flop is initially in the state representing a 1, it can be changed to the state representing 0 by the application of an input pulse of current between the terminals 9 and 10 which are connected to the winding of cryotron 0.

The notation to be used at the output cryotrons will be explained as follows. The binary digit stored in the flip-flop can be represented by the letter A, where A is equal to either 1 or 0. The symbol $\bar{A}$ means the inverse of A, and $\bar{A}$ is equal to 0 when A is equal to 1 and $\bar{A}$ is equal to 1 when A is equal to 0. With this notation, the contact of an output cryotron will be in the superconductive or normal-resistance condition in accordance with whether the letter symbol on the cryotron is equal to a 1 or a 0, respectively. For example, if the flip-flop in FIG. 4 is storing a 0, as indicated by the arrows for the current flow, $\bar{A}$ will be equal to 1, and the resistance between terminals 7 and 8 at the opposite ends of the contact of the $\bar{A}$ cryotron will be zero. There will be a non-zero resistance between terminals 5 and 6 at the opposite ends of the contact of cryotron A. The opposite conditions will prevail when the flip-flop is storing a 1 instead of a 0.

A flip-flop circuit, or other suitable circuit for handling binary signals, may have two or more output cryotrons on each side. In this case the windings of the cryotrons would be connected in series on each side, and the functioning of the flip-flop would not be altered. Similarly, a flip-flop may have two or more input cryotrons on each side. In this case the contacts of the input cryotrons on one side would be connected in series and the contacts of the input cryotrons on the other side would be connected in series. An input current to any one input cryotron is then sufficient to set the flip-flop to the state corresponding to the side in which this cryotron is connected.

The adder circuit of FIG. 5 includes three flip-flops of the type which has been described. Storage cryotrons 25 and 26 are included in one flip-flop wherein cryotrons 27 and 28 serve as the input cryotrons. Cryotrons 51, 33, and 53 serve as the output cryotrons on the A side and cryotrons 52, 34 and 54 serve as the output cryotrons on the $\bar{A}$ side. This flip-flop is used to store one digit, designated A, of one of the two numbers to be added. A second flip-flop is used to store the digit, designated B, of the other number to be added. This second flip-flop comprises storage cryotrons 29 and 30, with cryotrons 31 and 32 as input cryotrons, and with cryotrons 35 and 37 as output cryotrons on the B side and with cryotrons 36 and 38 as output cryotrons on the $\bar{B}$ side. A third flip-flop, for storing the sum digit, S, is comprised of storage cryotrons 41 and 42. In this case cryotrons 43 and 44 serve as input cryotrons on the 0 side and cryotrons 45 and 46 serve as input cryotrons on the 1 side. Cryotrons 39 and 40 serve as output cryotrons, the relative conductance of their contacts indicating whether or not a sum has been entered in the process of adding two numbers.

In the circuit of FIG. 5, there are connections from an input terminal 47 through the contact of cryotron 35 to a point 59 in the circuit and from 47 through the contact of cryotron 36 to a point 60. From another input terminal 48, there are connections through the contact of cryotron 37 to the point 60 and through the contact of cryotron 38 to a point 61. There are connections from the point 59 through the contact of cryotron 51 to a point 55 and through the contact of cryotron 52 to a point 56. Connections are made from the point 60 through the contact of cryotron 33 to the point 56 and through the contact of cryotron 34 to a point 57. Connections also are made from the point 61 through the contact of cryotron 53 to the point 57 and through the contact of cryotron 54 to a point 58. A current path is formed by connections from the point 55 through the input winding of cryotron 45 to an output terminal 49; another path is formed from the point 56 through the input winding of cryotron 43 to the terminal 49; another path exists from point 57 through the input winding of cryotron 46 to another output terminal 50; and a path is formed by connections from the point 58 through the input winding of cryotron 44 to the terminal 50.

The three flip-flops in the circuit of FIG. 5 are maintained in their respective stable states by current supplied by current sources 2, which may be like the current source 2 of FIG. 4, connected between terminals 3*a* and 4*a*, between 3*b* and 4*b*, and between 3*s* and 4*s* for the A, B, and S binary digits, respectively.

Figure 7:
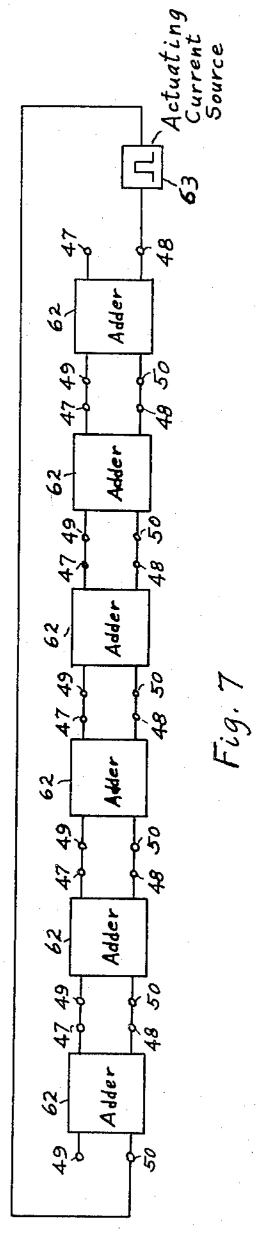
FIG. 7 is a block diagram of a complete adder circuit utilizing the invention.

To form a complete accumulator or addition unit, two or more adder circuits 62, each identical to the circuit shown in FIG. 5, are connected as shown in FIG. 7. The number of adder circuits required is at least equal to the number of digits in the binary numbers to be added. The input terminals 47 and 48 in each adder circuit serve as carry input terminals and the output terminals 49 and 50 serve as carry output terminals. The input terminals 47 and 48 of a given adder circuit, other than the first, are connected to the output terminals 49 and 50 of the adder in the next lower order, and the output terminals 49 and 50 of a given adder, other than the last, are connected to input terminals 47 and 48, respectively, in the adder of the next higher order, in the manner shown in FIG. 7.

To add two binary numbers, the digits of these numbers are initially entered into the flip-flops for storing the A and B digits, respectively, in the respective orders of the adder circuits. This entry may be accomplished, for example, by applying suitable currents between terminals 9*a* and 10*a* for entering a 0 into a given A-storage flip-flop, and so forth. To perform the actual addition operation, a pulse of actuating current is applied between the carry input terminals of the lowest binary order and the carry output terminals of the highest binary order. To accomplish this, the carry input terminals of the lowest-order adder may be connected jointly to one terminal of a source 63 of actuating current, and the carry output terminals of the highest-order adder may be connected jointly to the other terminal of the source of actuating current. One and only one zero-resistance path will exist through the adders of the various orders, the actual path being determined by the binary values of the digits being added. Specifically, in the two wires interconnecting the adder circuits of any two successive orders the current will pass through the wires corresponding to terminals 47 and 49 if a carry digit is to be transmitted from one order to the next or it will pass through the wires corresponding to terminals 48 and 50 if no carry is to be transmitted. Actually, in simple addition, no carry will be entered into the lowest order and no carry will be obtained from the highest order, so the terminals between which the source 63 of actuating current is connected is terminal 48 in the lowest order and terminal 50 in the highest order, as shown in FIG. 7. The sum is read from the settings of the output cryotrons in the sum flip-flops.

For an explanation of the operation of the adder circuit of any given order, with reference to FIG. 5, assume first that no carry is being received from the next lower order. The actuating current therefore arrives at terminal 48 of the adder under consideration. If digits A and B in this order are both 0, a zero-resistance path exists from terminal 48 through point 61, through point 58, and through the input winding of cryotron 44 to terminal 50. The passage of current therefore causes the sum flip-flop to be set to 0 and the carry output signal to be present at terminal 50, as is desired when all three of the binary digits added in a given order are 0.

If A is 1 and B is 0, the zero-resistance path will be from terminal 48 through point 57, and then through the input winding of cryotron 46 to terminal 50. The sum flip-flop will be set to 1 in this case, and the carry will be 0 as before. If A is 0 and B is 1, the zero-resistance path will be from terminal 48 through point 60 to point 57 with the continuing path the same as before. If the carry input is 1, the arriving current will be at terminal 47, and if A and B are both 0, the zero-resistance path will be from 47 through point 60 to point 57 with the same continuing path. It may be observed that when one and only one of the three input signals (A, B, and the carry input) is 1, the sum flip-flop is set to 1 and the carry signal appears at terminal 50.

If the carry input is 0 and both A and B are 1, the path is from terminal 48 through point 60, through point 56, and through the input winding of cryotron 43 to terminal 49. In this case the sum flip-flop is set to 0 and the carry signal represents a carry of 1. Also, if the carry input is 1 and A is 1 and B is 0, the path will be from 47 through 60 to 56. If the carry input is 1 and if A is 0 and B is 1, the path will be from 47 through 59 to 56. The sum flip-flop will therefore be set to 0 with a carry output representation of 1 for each case where two of the three input signals are 1.

When all three of the input signals are 1, the zero-resistance path will be from terminal 47 through point 59, through point 55, and through the input winding of cryotron 45 to terminal 49. In this case the sum flip-flop will be set to 1, and the carry output signal will represent a 1, as is desired when all three binary digits being added are 1's.

From the above-described operation of the circuit of FIG. 5, it is seen that the four connecting wires on which the points 55, 56, 57 and 58 are located, constitute four carry-current channels, and the carry input current will flow through one or another of these four channels in accordance with whether the sum of the three input digits is three, two, one, or zero, as is indicated in the drawing. If this sum is zero or two, the sum circuit is set to indicate no sum, but if this sum is one or three, the sum circuit is set to indicate a sum. Also, if this sum is zero or one, the carry current pulse is directed to the no-carry output terminal 50, but if this sum is two or three, the carry current pulse is directed to the carry output terminal 49.

In the explanation of the operation of the circuit in FIG. 5, it has been assumed that the direction of current flow is generally from right to left in the figure. Actually, the current may flow in either direction. The important consideration is the path which is opened to the flow of current as determined by the zero-resistance condition, and the path at any given point is determined by the circuit conditions to the right of that point, as explained above.

Figure 6:
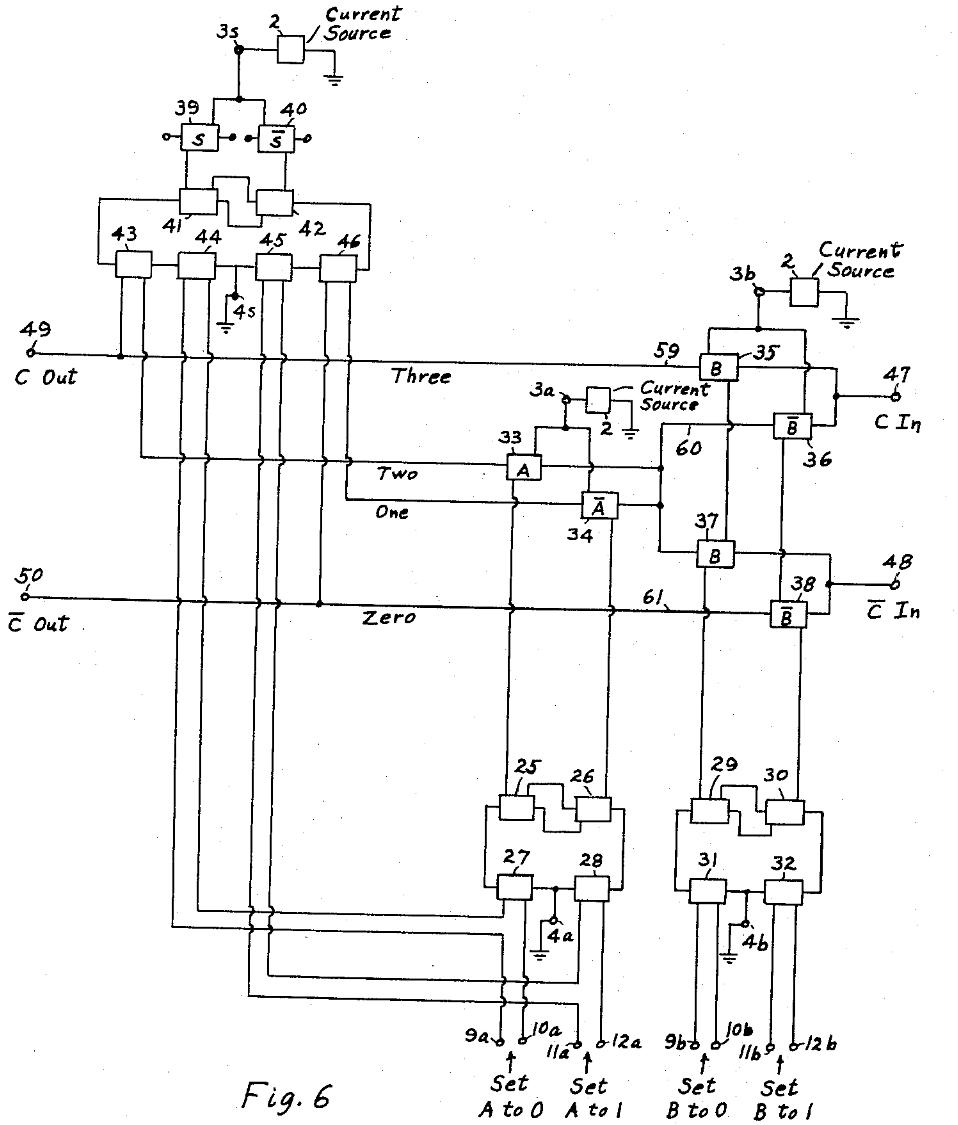
FIG. 6 is a schematic diagram of another embodiment of a single-order adder circuit in accordance with the invention.

The circuit in FIG. 6 differs from the circuit in FIG. 5 in that the input windings of cryotrons 44 and 45 are connected in series with the input windings of the cryotrons 27 and 28, respectively, of the flip-flop used to store A, with the result that at the time a number is entered into the A flip-flop the same number is entered into the sum flip-flop. The purpose of this connection is that it then becomes unnecessary to provide a signal for setting a given sum flip-flop to 0 when it already contains a 0, and it is unnecessary to provide a signal for setting it to 1 when it already contains a 1. Cryotrons 51, 52, 53 and 54 of FIG. 5 may then be eliminated, with the point 59 being connected directly to terminal 49 and point 61 being connected directly to terminal 50.

Now, if no carry is received from the next lower order and if B is 0, the sum flip-flop will already be in the desired state regardless of the value of A (since if A is 1, the sum is to be 1, but the sum flip-flop is already at 1; similarly if A is 0, the sum is to be 0, but the sum flip-flop is already at 0). Also, if a carry is received from the next lower order and if A and B are both 1, the sum flip-flop will already be in the desired state regardless of the value of A (for analogous reasons). Therefore, under these conditions the zero-resistance path leads from a carry input terminal to a carry output terminal without passing through an input cryotron in the sum flip-flop. The operation of the circuit in FIG. 6 is otherwise the same as the operation of the circuit in FIG. 5.

The principles of this invention can be adapted to subtraction (or, the addition of a negative number) by any of several different procedures. One procedure is to alter the circuit so that the rules of subtraction instead of the rules of addition are followed. The alterations can be worked out in a straightforward manner by one skilled in the art. A simpler procedure is to add the 1's complement of the number to be subtracted. In this method each 1 in the number to be subtracted is changed to a 0, and each 0 is changed to a 1. The operation of the adder circuit is then exactly the same as before except that for correct results in all cases it is necessary to provide for an "end-around" carry. An end-around carry is achieved by entering the carry from the highest order into the lowest order, which is the units order. Since the actuating signal is applied to the carry circuits in the adder of this invention, some means must be provided to separate the end-around carry from the actuating signal. Also, when a number is subtracted from itself, it is generally desired that the result (zero) be represented as a positive number instead of a negative number as is the natural result of the subtraction method which employs 1's complements with end-around carry.

The characteristics of subtraction with 1's complements can be explained by a consideration of the following example. Assume that the binary number 000101 (decimal 5) is to be subtracted from 010110 (decimal 22). The procedure is to add the 1's complement of 000101, which is 111010, to 010110. The result is:

```
010110
111010
------
010000
     1 end-around carry
------
010001
```

which is decimal 17, the correct answer. However, if 100011 (decimal 35) for example is subtracted, its 1's complement or 011100 is added as follows:

```
010110
011100
------
110010 (no end-around carry).
```

In this case the difference is 110010 which is the 1's complement of 001101 (decimal 13), which represents the correct difference (negative) between 22 and 35. It may be observed that the difference is positive or negative according to whether an end-around carry does or does not occur.

Now if 010110 is subtracted from itself, the following result is obtained:

```
010110
101001
------
111111 (no end-around carry)
```

Since no end-around carry is produced, a negative difference is indicated. The result is therefore the 1's complement of 000000, or in other words, negative zero.

The problem with regard to negative zero can be avoided by artificially introducing a carry into the lowest order of an adder unit and then withdrawing it in those instances where it is found not necessary. In the above example, the result is thereby obtained:

```
010110
101001
------
111111
     1 artificially introduced end-around carry
------
000000
   (1) end-around carry now produced but not
       used.
```

Since the entering of an artificial end-around carry produced a real end-around carry, it is known that the difference is positive (and zero in this case). Except as an indication of sign, the real end-around carry may be disregarded because of the artificial end-around carry.

However, when no end-around carry is produced, such as in the example of subtracting 35 from 22, the artificially introduced carry in the lowest order must be withdrawn to yield the correct result.

Figure 8:
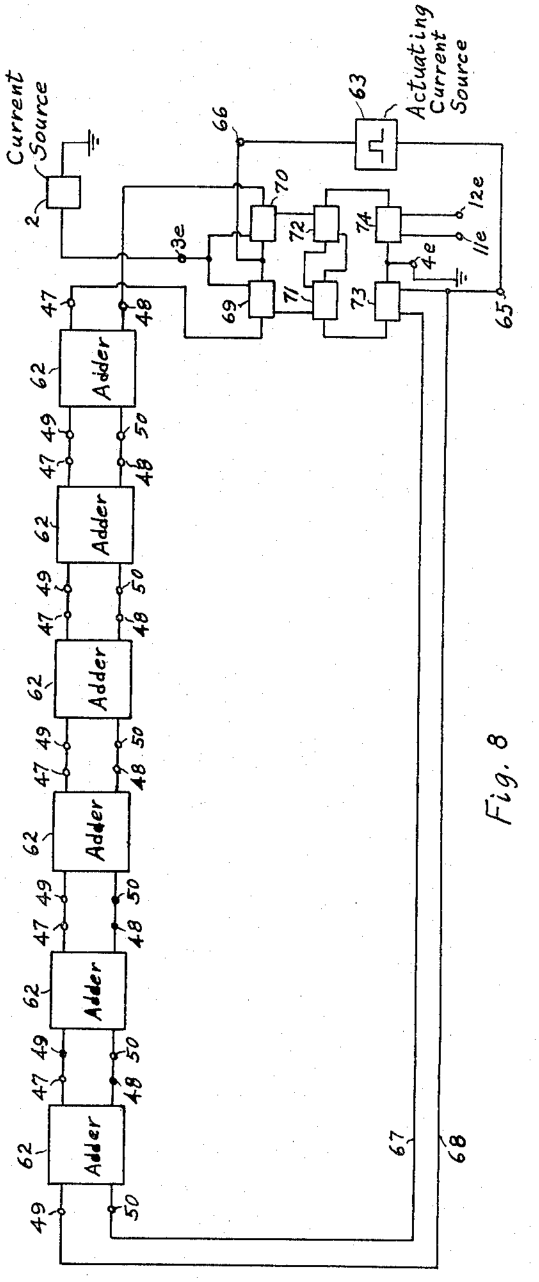
FIG. 8 is a block and schematic diagram of a complete adder circuit wherein the invention is adapted to perform the addition of a negative number (subtraction).

The circuit arrangement shown in FIG. 8 accomplishes the desired functions when negative numbers are added. The six adder circuits 62 in this figure may each be of the type shown in FIG. 5, and are connected to one another in the same manner as has been described with reference to FIG. 7. The circuit in FIG. 6 is not directly applicable in this instance because of the need to return certain of the sum flip-flops to their original states after it is determined that there is to be no end-around carry. An additional end-around carry flip-flop is provided and is comprised of cryotrons 71 and 72, with input cryotrons 73 and 74 and with output cryotrons 69 and 70, the current source 2 being connected between the terminals 3*e* and 4*e* and the output terminals 49, 50 of the highest-order adder being connected across the input winding of cryotron 73. Prior to the addition or subtraction operation, this flip-flop is set to the 1 state by the passage of current between terminals 11*e* and 12*e* through the input winding of cryotron 74. This operation may take place during the time that the numbers to be added are being entered in the A and B flip-flops in the adder circuits 62. With the end-around carry flip-flop at 1, a zero-resistance path exists in the contact of cryotron 69. To add the two numbers, a pulse of actuating current is passed between terminals 66 and 65, by means of a source 63 of actuating current pulses connected between the terminals 65 and 66. The initial path of current is then from terminal 66 through the contact of cryotron 69 to terminal 47 of the adder in the lowest order and then through the adders in the manner described previously. The fact that the current enters terminal 47 means that a carry of 1 is entered in the lowest order.

If a carry of 1 occurs from the highest order, the current will emerge from terminal 49 of that order and will proceed along wire 68 to terminal 65 without any further action taking place. However, if a carry of 0 (that is, no carry) occurs from the highest order, the current will emerge from terminal 50 and will flow along wire 67 and through the input winding of cryotron 73 on its way to terminal 65. The end-around carry flip-flop will then be set to the 0 state. The current from terminal 66 will now flow through the contact of cryotron 70 and cause a carry of 0 to be entered into the lowest order. As before, the direction of current flow between terminals 65 and 66 is of no consequence although the action of the circuit is more easily visualized when the direction is as assumed above.

Many variations in the adder circuit can be devised by one skilled in the art. For example, in the circuit of FIG. 6 it is possible to set the sum flip-flop to the value opposite to that of one of the A or B digits instead of to the same value. A similar saving in components (in comparison with the circuit of FIG. 5) can be achieved by developing signals for the sum flip-flop only in those cases where the sum digit is not the same as the binary digit initially entered in the sum flip-flop.

With the circuit arrangement of either FIG. 5 or FIG. 6, the sum flip-flop may actually be the same as either the A or the B flip-flop for a total of only two flip-flops in each binary order. However, in this case the duration of the actuating signal applied to the carry circuit must be closely controlled.

The adder can be varied in many ways as needed to adapt it to special situations. An example is binary multiplication where a shift to the right of one place is desired when adding the multiplicand in forming a product. With the circuit of FIG. 6, the sum flip-flop in the next lower order with respect to any given order is set to the value of the A digit at the time of entry of the A number into the A flip-flops, and the sum is similarly entered shifted one order to the right. The shift is made to the left if the multiplier digits are considered in the opposite sequence.

The principles of the adder circuit can be adapted to the decimal system of numbers by any of several different methods, especially when the decimal digits are represented in the conventional 8—4—2—1 binary code. In this case an additional corrective 6 is added for each pair of decimal digits that produce a sum greater than 9.

It is to be understood that the disclosed arrangements are illustrative of the preferred embodiments and applications of the principles of the invention. Other arrangements may be devised by those skilled in the art without departing from the spirit and scope of the invention as defined in the claims.

What is claimed is:

1. A complete adder circuit comprising a plurality of individual adder circuits connected in a sequential arrangement, each of said individual adder circuits comprising first and second carry input lines for receiving alternative carry currents indicative of the presence or lack of carry, respectively, four current-conductive channels, first and second digit input circuits each having at least one current-directing means for alternatively directing a current into a plurality of output paths in accordance with input digits respectively applied to said digit input circuits, means interconnecting said current-directing means between said carry input lines and said current conductive channels so as to direct the carry input current to a different channel accordingly as the sum of the carry and the first and second digits is zero, one, two, or three, a first carry output line connected to receive any carry current which occurs in the channels which are associated with said sum of two and said sum of three, thereby indicating the presence of a carry, a second carry output line connected to receive any carry current which occurs in the channels which are associated with said sum of zero and said sum of one, thereby indicating the lack of a carry, and a sum circuit connected to at least two of said channels and adapted to indicate a sum digit when said sum is one or three, the first and second carry output lines of each of said individual adder circuits except the last one thereof being connected to the first and second carry input lines, respectively, of the next succeeding individual adder circuit, an actuating current source, and means connecting said actuating current source between a carry input line of the first one of said individual adder circuits and a carry output line of the last one of said individual adder circuits.

2. A complete adder circuit as claimed in claim 1, further including an end-around carry flip-flop having two input sides and an output circuit comprising two output sides adapted to be alternatively conductive as determined by one or more input signals applied to said input sides, said output circuit being connected between said actuating current source and the carry input lines of said first individual adder circuit so that the actuating current is alternatively applied to one or the other of the carry input lines of said first individual adder circuit, and means connecting the carry output lines of said last individual adder circuit across one of said input sides, whereby said adder circuit is capable of adding negative numbers.

3. An adder circuit as claimed in claim 1, in which said sum circuit comprises a flip-flop circuit having a first input side containing a pair of input elements and having a second input side containing a pair of input elements, means connecting the input elements of said first side in series with said channels associated with sums of zero and two, respectively, and means connecting the input elements of said second side in series with said channels associated with sums of one and three, respectively.

4. An adder circuit as claimed in claim 1, in which said sum circuit comprises a flip-flop circuit having a first input side containing a pair of input elements and having a second input side containing a pair of input elements, means connecting an element of said first input side in series with said channel associated with a sum of one, means connecting an element of said second input side in series with said channel associated with a sum of two, and means connecting the remaining said input elements to one of said digit input circuits to cause said flip-flop circuit to be preset in accordance with the input digit applied to the last-mentioned digit input circuit.

5. An adder circuit comprising a carry current input means for supplying alternative carry currents to indicate the presence or lack of a carry, respectively, four current-conductive channels, first and second digit input circuits each having at least one current-directing means for alternatively directing a current into a plurality of output paths in accordance with input digits respectively applied to said digit input circuits, means interconnecting said current-directing means between said carry input means and said current-conductive channels so as to direct the carry input current to a different channel accordingly as the sum of the carry and the first and second digits is zero, one, two, or three, a first carry output line connected to receive any carry current which occurs in the channels which are associated with said sum of two and said sum of three, thereby indicating the presence of a carry, a second carry output line connected to receive any carry current which occurs in the channels which are associated with said sum of zero and said sum of one, thereby indicating the lack of a carry, and a sum circuit connected to at least two of said channels and adapted to indicate a sum digit when said sum is one or three.

6. An adder circuit as claimed in claim 5, wherein the first and second input digit circuits each comprises a flip-flop having an output circuit including a pair of circuit elements connected to be alternatively in a current-conductng condition and constituting the aforesaid respective current-directing means.

7. An adder circuit as claimed in claim 6, wherein the sum circuit includes a flip-flop, and is connected to the aforesaid at least two channels via the input circuit of such flip-flop.

8. An adder circuit as claimed in claim 6 wherein the sum circuit includes a flip-flop comprising two input sides each having two cryotrons, each of the last-named cryotrons having an input winding, means connecting the input windings of the cryotrons of one of said input sides in series with said channels associated with sums of zero and two, respectively, the aforesaid at least two channels being the channels associated with sums of one and three respectively, and being connected to the sum circuit through the input windings of the cryotrons of the other one of said input sides, respectively.

9. An adder circuit as claimed in claim 5, wherein the first and second input digit circuits each comprises a flip-flop having an output circuit comprising at least one pair of cryotrons connected to be alternatively in substantially zero-resistance condition as determined by input digits respectively applied to said flip-flops and constituting the aforesaid respective current-directing means.

10. An adder circuit as claimed in claim 9, wherein the sum circuit includes a flip-flop, and is connected to the aforesaid at least two channels via the input circuit of such flip-flop.

11. An adder circuit as claimed in claim 9, wherein the flip-flop of at least one of said digit input circuits comprises two sides each having a cryotron having an input winding, wherein the sum circuit includes a flip-flop comprising two input sides each having two cryotrons, each of the last-named cryotrons having an input winding, and wherein the connection to the aforesaid at least two channels includes means connecting the input winding of a cryotron in one of the latter input sides in series with said channel associated with a sum of one, means connecting the input winding of a cryotron in the other of said latter input sides in series with said channel associated with a sum of two, and means connecting the remaining said input windings of the cryotrons in the sum circuit in series with said input windings of the cryotrons in a digit input circuit, respectively, whereby said sum circuit is preset in accordance with the input digit applied to the last-mentioned digit input circuit.

12. An adder circuit as claimed in claim 5, wherein the sum circuit includes a flip-flop, and is connected to the aforesaid at least two channels via the input circuit of such flip-flop.

13. An adder circuit as claimed in claim 5, wherein the sum circuit includes a flip-flop comprising two input sides each having two cryotrons, each of the last-named cryotrons having an input winding, means connecting the input windings of the cryotrons of one of said input sides in series with said channels associated with sums of zero and two, respectively, the aforesaid at least two channels being the channels associated with sums of one and three respectively, and being connected to the sum circuit through the input windings of the cryotrons of the other one of said input sides, respectively.

14. An adder circuit comprising first and second carry input lines for receiving alternative carry currents indicative of the presence or lack of a carry, respectively, four current-conductive channels, first and second digit input circuits each comprising a cryotron flip-flop having an output circuit comprising at least one pair of output cryotrons connected to be alternatively in a substantially zero-resistance condition as determined by input digits respectively applied to said flip-flops, means interconnecting said output circuits between said carry input lines and said current-conductive channels so as to direct the carry input current to a different channel accordingly as the sum of the carry and the first and second digits is zero, one, two, or three, a first carry output line connected to receive any carry current which occurs in the channels which are associated with said sum of two and said sum of three, thereby indicating the presence of a carry, a second carry output line connected to receive any carry current which occurs in the channels which are associated with said sum of zero and said sum of one, thereby indicating the lack of a carry, and a sum circuit comprising a cryotron flip-flop having input windings connected to at least two of said channels and adapted to indicate a sum digit when said sum is one or three.

15. An adder circuit as claimed in claim 14, in which said cryotron flip-flop of the sum circuit comprises two input sides each having two cryotrons, each of the last-named cryotrons having an input winding, means connecting the input windings of the cryotrons of one of said input sides in series with said channels associated with sums of zero and two, respectively, and means connecting the input windings of the cryotrons of the other one of said input sides in series with said channels associated with sums of one and three, respectively.

16. An adder circuit as claimed in claim 14, in which said cryotron flip-flop of the sum circuit comprises two input sides each having two cryotrons, each of the last-named cryotrons having an input winding, means connecting the input winding of a cryotron in one of said input sides in series with said channel associated with a sum of one, means connecting the input winding of a cryotron in the other one of said input sides in series with said channel associated with a sum of two, the flip-flop of at least one of said digit input circuits comprising two sides each having a cryotron having an input winding, and means connecting the remaining said input windings of the cryotrons in the sum circuit in series with said input windings of the cryotrons in a digit input circuit, respectively, whereby said sum circuit is preset in accordance with the input digit applied to the last-mentioned digit input circuit.

17. An adder circuit comprising first and second carry input lines for receiving alternative carry currents indicative of the presence or lack of a carry, respectively, a first digit input circuit comprising a cryotron flip-flop having a first output side comprising first and second output cryotrons and having a second output side comprising third and fourth output cryotrons, means connecting said first carry input line to a contact terminal of each of said first and third output cryotrons, means connecting said second carry input line to a contact terminal of each of said second and fourth output cryotrons, a second digit input circuit comprising a cryotron flip-flop having a first output side comprising at least one output cryotron and having a second output side comprising at least one output cryotron, means connecting a contact terminal of an output cryotron of each of the first and second sides of said second digit input circuit jointly to the remaining contact terminals of said third and fourth output cryotrons, first and second carry output lines, a sum circuit comprising a cryotron flip-flop having two input sides each having two cryotrons, each of the last-named cryotrons having an input winding, means connecting the input winding of a cryotron in one of said input sides between said first carry output line and the remaining contact terminal of one of the output cryotrons of said second digit input circuit, means connecting the input winding of a cryotron in the other of said input sides between said second carry output line and the remaining contact terminal of the other one of said output cryotrons of said second digit input circuit, means connecting said first carry output line to the remaining contact terminal of said first output cryotron, means connecting said second carry output line to the remaining contact terminal of said fourth output cryotron, and current supply means respectively connected to the remaining said input windings of the cryotrons in the sum circuit for causing said sum circuit to indicate a sum digit whenever the sum of said carry and said first and second digits is one or three.

18. An adder circuit comprising first and second carry input lines for receiving alternative carry currents indicative of the presence or lack of a carry, respectively, a first digit input circuit comprising a cryotron flip-flop having first and second output sides each comprising a plurality of cryotrons, first, second and third junctions, means connecting the terminals of the contact of a cryotron in said first output side in series between said first carry input line and said first junction, means connecting the terminals of the contact of another cryotron in said first output side in series between said second carry input line and said second junction, means connecting the terminals of the contact of a cryotron in said second output side in series between said first carry input line and said second junction, means connecting the terminals of the contact of another cryotron in said second output side in series between said second carry input line and said third junction, a second digit input circuit comprising a cryotron flip-flop having first and second output sides each comprising a plurality of cryotrons, fourth and fifth junctions, means connecting the terminals of the contact of a cryotron in the last-named second output side in series between said first and fourth junctions, means connecting the terminals of the contact of a cryotron in the last-named first output side in series between said second and fourth junctions, means connecting the terminals of the contact of another cryotron in said last-named second output side in series between said second and fifth junctions, means connecting the terminals of the contact of another cryotron in said last-named first output side in series between said third and fifth junctions, a sum circuit comprising a cryotron flip-flop having first and second input sides each comprising a plurality of input windings, first and second carry output lines, means connecting an input winding in said first input side in series between said first carry output line and said fourth junction, means connecting an input winding in said second input side in series between said second carry output line and said fifth junction, means connecting another input winding in said first input side and the contact of another cryotron in said last-named second output side of the second digit input circuit in series between said second carry output line and said third junction, and means connecting another input winding in said second input side and the contact of another cryotron in said last-named first output side of the second digit input circuit in series between said first carry output line and said first junction.

19. An adder circuit comprising first and second carry input lines for receiving alternative carry currents indicative of the presence or lack of a carry, respectively, a first digit input circuit comprising a cryotron flip-flop having first and second output sides each comprising a plurality of cryotrons, a junction, means connecting the terminals of the contact of a cryotron in said first output side in series between said junction and said second carry input line, means connecting the terminals of the contact of a cryotron in said second output side in series between said junction and said first carry input line, first and second carry output lines, means connecting the terminals of the contact of another cryotron in said first output side in series between said first carry output line and said first carry input line, means connecting the terminals of the contact of another cryotron in said second output side in series between said second carry output line and said second carry input line, a second digit input circuit comprising a cryotron flip-flop having first and second input sides each comprising an input winding and having first and second output sides each comprising at least one cryotron, a sum circuit comprising a cryotron flip-flop having first and second input sides each comprising a plurality of input windings, means connecting an input winding in the first input side of said sum circuit and the terminals of the contact of a cryotron in the first output side of said second digit input circuit in series between said first carry output line and said junction, means connecting an input winding in the second input side of said sum circuit and the terminals of the contact of a cryotron in the second output side of said second digit input circuit in series between said second carry output line and said junction, means connecting a remaining input winding in the first input side of said sum circuit in series with the input winding in the first input side of said second digit input circuit, and means connecting a remaining input winding in the second input side of said sum circuit in series with the input winding in the second input side of said second digit input circuit.

20. A complete adder circuit for adding negative numbers, comprising a plurality of individual adder circuits connected in sequence and each having first and second carry input lines for receiving alternative carry input currents indicative of the presence or lack of a carry, respectively, and each of said individual adder circuits having first and second carry output lines to which the carry input current is alternatively directed to indicate the presence or lack of a carry output, respectively, means connecting the first and second carry output lines of each of said individual adder circuits except the last one thereof to the first and second carry input lines, respectively, of the next succeeding individual adder circuit, and an end-around carry flip-flop having two input sides and an output circuit comprising two output sides adapted to be alternatively conductive as determined by one or more input signals applied to said input sides, a source of actuating current having a first terminal connected to the first carry output line of said last individual adder circuit and having a second terminal, means connecting said output circuit between said second terminal and the first and second carry input lines of the first of said sequentially connected individual adder circuits thereby to connect said second terminal alternatively to one or the other of the last-mentioned first and second carry input lines, and means connecting the carry output lines of said last individual adder circuit across an input side of said flip-flop.

21. An adder circuit comprising first and second carry input lines for receiving alternative carry currents indicative of the presence or lack of a carry, respectively, a first digit input circuit comprising a flip-flop having a first output side comprising first and second output cryotrons and having a second output side comprising third and fourth output cryotrons, means connecting said first carry input line to a contact terminal of each of said first and third output cryotrons, means connecting said second carry input line to a contact terminal of each of said second and fourth output cryotrons, a second digit input circuit comprising a flip-flop having a first output side comprising at least one output cryotron and having a second output side comprising at least one output cryotron, means connecting a contact terminal of an output cryotron of each of the first and second sides of said second digit input circuit jointly to the remaining contact terminals of said third and fourth output cryotrons, first and second carry output lines, a sum circuit comprising two input sides each having two cryotrons, each of the last-named cryotrons having an input winding, means connecting the input winding of a cryotron in one of said input sides between said first carry output line and the remaining contact terminal of one of the output cryotrons of said second digit input circuit, means connecting the input winding of a cryotron in the other of said input sides between said second carry output line and the remaining contact terminal of the other one of said output cryotrons of said second digit input circuit, means connecting said first carry output line to the remaining contact terminal of said first output cryotron, means connecting said second carry output line to the remaining contact terminal of said fourth output cryotron, and current supply means respectively connected to the remaining said input windings of the cryotron in the sum circuit for causing said sum circuit to indicate a sum digit whenever the sum of said carry and said first and second digits is one or three.

22. An adder circuit comprising first and second carry input lines for receiving alternative carry currents indicative of the presence or lack of a carry, respectively, a first digit input circuit comprising a flip-flop having first and second output sides each comprising a plurality of cryotrons, first, second and third junctions, means connecting the terminals of the contact of a cryotron in said first output side in series between said first carry input line and said first junction, means connecting the terminals of the contact of another cryotron in said first output side in series between said second carry input line and said second junction, means connecting the terminals of the contact of a cryotron in said second output side in series between said first carry input line and said second junction, means connecting the terminals of the contact of another cryotron in said second output side in series between said second carry input line and said third junction, a second digit input circuit comprising a flip-flop having first and second output sides each comprising a plurality of cryotrans, fourth and fifth junctions, means connecting the terminals of the contact of a cryotron in the last-named second output side in series between said first and fourth junctions, means connecting the terminals of the contact of a cryotron in the last-named second output side in series between said first and fourth junctions, means connecting the terminals of the contact of a cryotron in the last-named first output side in series between said second and fourth junctions, means connecting the terminals of the contact of another cryotron in said last-named second output side in series between said second and fifth junctions, means connecting the terminals of the contact of another cryotron in said last-named first output side in series between said third and fifth junctions, a sum circuit comprising first and second input sides each comprising a plurality of input windings, first and second carry output lines, means connecting an input winding in said first input side in series between said first carry output line and said fourth junction, means connecting an input winding in said second input side in series between said second carry output line and said fifth junction, means connecting another input winding in said first input side and the contact of another cryotron in said last-named second output side of the second digit input circuit in series between said second carry output line and said third junction, and means connecting another input winding in said second input side and the contact of another cryotron in said last-named first output side of the second digit input circuit in series between said first carry output line and said first junction.

23. An adder circuit comprising first and second carry input lines for receiving alternative carry currents indicative of the presence or lack of a carry, respectively, a first digit input circuit comprising a flip-flop having first and second output sides each comprising a plurality of cryotrons, a junction, means connecting the terminals of the contact of a cryotron in said first output side in series between said junction and said second carry input line, means connecting the terminals of the contact of a cryotron in said second output side in series between said junction and said first carry input line, first and second carry output lines, means connecting the terminals of the contact of another cryotron in said first output side in series between said first carry output line and said first carry input line, means connecting the terminals of the contact of another cryotron in said second output side in series between said second carry output line and said second carry input line, a second digit input circuit comprising a flip-flop having first and second input sides each comprising an input winding and having first and second output sides each comprising at least one cryotron, a sum circuit comprising first and second input sides each comprising a plurality of input windings, means connecting an input winding in the first input side of said sum circuit and the terminals of the contact of a cryotron in the first output side of said second digit input circuit in series between said first carry output line and said junction, means connecting an input winding in the second input side of said sum circuit and the terminals of the contact of a cryotron in the second output side of said second digit input circuit in series between said second carry output line and said junction, means connecting a remaining input winding in the first input side of said sum circuit in series with the input winding in the first input side of said second digit input circuit, and means connecting a remaining input winding in the second input side of said sum circuit in series with the input winding in the second input side of said second digit input circuit.

References Cited in the file of this patent

Harvard Report, Synthesis of Electronic Computing and Control Circuits, by The Staff of the Computation Laboratory (May 1951). The Harvard Press, Cambridge, Mass. Pages 159 to 161 relied upon.

Buck, The Cryotron—A Superconductive Computer Component. Proceedings of the I.R.E., vol. 44, No. 4 (April 1956). Pages 482 to 493.